2,878,322
EYEGLASS HEARING AID CONSTRUCTION

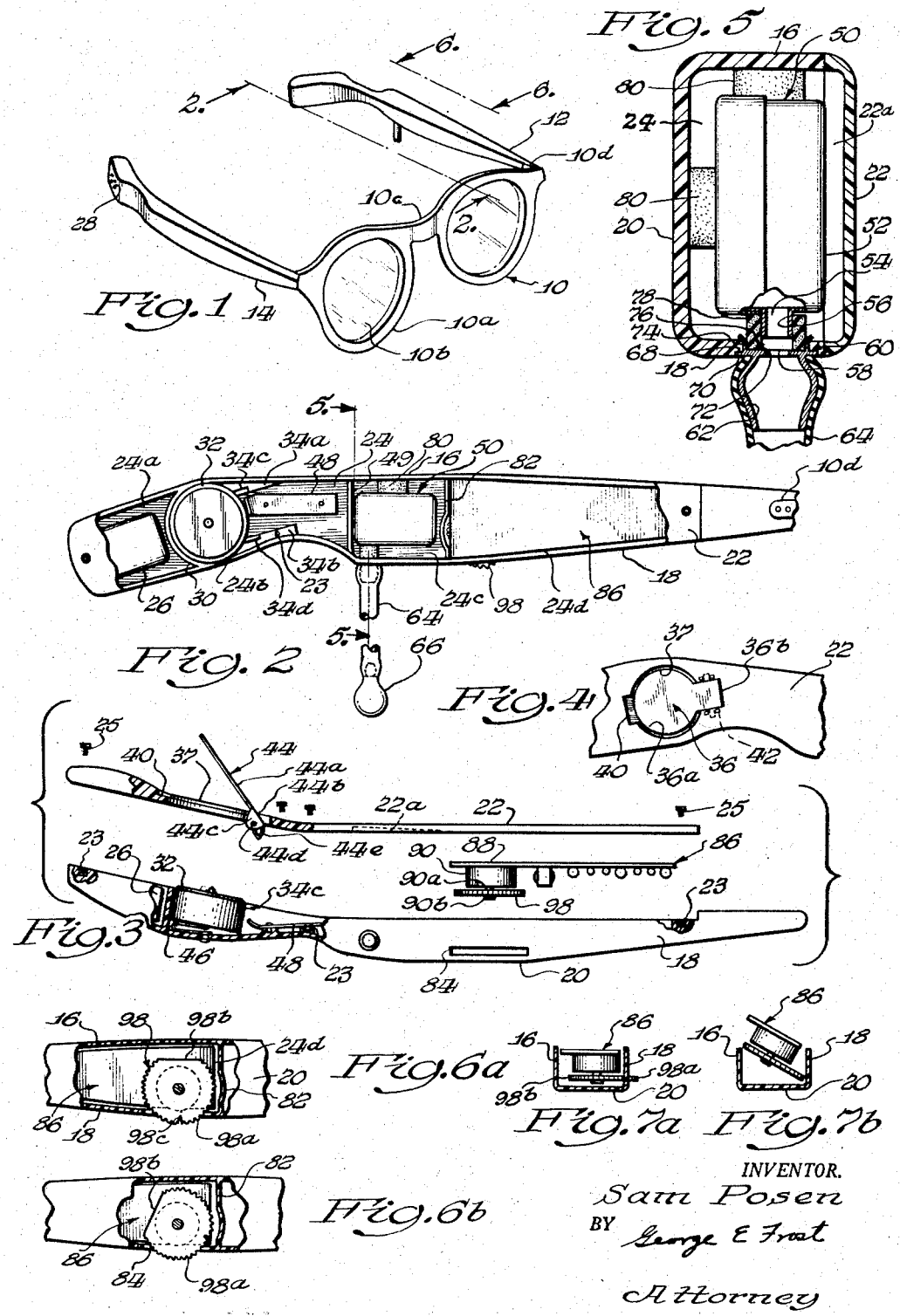

Sam Posen, Chicago, Ill., assignor to Beltone Hearing Aid Company, Chicago, Ill., a corporation of Illinois Application August 31, 1956, Serial No. 607,404

4 Claims. (Cl. 179—107)

This invention relates to an eyeglass hearing aid having a removable amplifying unit and an improved receiver mounting construction.

An eyeglass hearing aid which has the hearing aid units contained within the temple member must be as compact as possible. At the same time the units of the hearing aid should be readily removable for replacement or repair. It is also important that the volume control of the hearing aid protrude through the temple member for quick and easy control by the wearer.

Because of the necessity for compactness, the amplifying unit which comprises a chassis and components such as transistors, resistors, capacitors, etc. must be closely held within the temple member. The protruding volume control knob carried within the temple member on a closely fitting chassis creates problems in the removal of the amplifying unit.

In the present invention a construction is provided which permits ready removal of the amplifying unit. In brief, the temple member of the hearing aid is channel shaped, having a web, to define a cavity. The temple member has a detachable cover to enclose the cavity, and a slot in one wall parallel to and adjacent the web member.

The amplifying unit comprises a chassis which carries the amplifying components including a volume control. The volume control has a rotatable shaft to which a control knob or disc is secured. The disc has an edge portion of generally circular conformation and another edge portion of smaller radial reach. The diametral distance across the knob from the latter edge portion is less than the span of the cavity.

In the assembled position the amplifying unit is closely received within the temple member. The circular edge portion of the control disc protrudes through the slot in the member wall for ready control by the wearer. However, the amplifying unit is quickly and easily removable after the detachable cover has been removed. To remove the amplifying unit the disc is merely rotated to a position where the edge portion having the smaller radial reach is opposite the slot. In this position there is ample clearance between the disc and the wall opposite the slot. The protruding portion of the disc can then be pushed through the slot to cock the amplifying unit at an angle and disengage the amplifying unit from the temple member.

Another problem encountered in compact eyeglass hearing aids is the mounting of the receiver. It is desirable, for the reduction of mechanical feedback, to isolate the receiver from the relatively rigid temple member. At the same time the receiver must be connected to an ear piece outside the temple member by a sound tube. In the construction of the present invention the receiver is effectively mechanically isolated from the rigid temple member. The receiver has a sound output opening with a protruding tube. In assembled position the tube is in spaced relation to an opening in the temple member. A grommet is fixedly received in this latter opening. The grommet protrudes outside the temple member and the protruding portion receives a sound tube which connects to an ear piece. Inside the temple member a cushioning tube connects the receiver output tube with the grommet. The cushioning tube, in addition to defining a part of the sound passage between the receiver and the ear piece, aids in supporting the receiver within the temple member, and at the same time, does not constitute a rigid connection between the receiver and the temple member. Cushioning means interposed between the receiver and some of the walls of the temple member supplement the cushioning tube in sustaining the receiver. With this construction the receiver can be held in spaced relation with the cover without cushioning means interposed between the cover and receiver. Thus a sound passage is defined between the receiver and the ear piece, and the receiver is held in spaced relation from the rigid temple member by cushioning means. This effectively mechanically isolates the receiver from the rigid temple member and reduces mechanical feedback.

It is therefore a general object of the present invention to provide a compact easily removable amplifying unit for an eyeglass hearing aid which has controls readily accessible to the wearer.

It is another object of the present invention to provide an amplifying unit for an eyeglass hearing aid having a control knob protruding through the temple member which can be readily disengaged from the temple member for easy removal.

It is a further object of the present invention to provide a mounting for an eyeglass hearing aid receiver by which the receiver is isolated from the rigid temple member in which it is carried.

It is yet another object of the present invention to provide means defining a sound passage from a receiver positioned inside the temple member of an eyeglass hearing aid to an ear piece outside the temple member whereby the receiver is mechanically isolated from the rigid temple member.

It is still another object of the present invention to provide means defining a sound passage from a receiver inside a temple member of an eyeglass hearing aid which aids in sustaining the receiver within the temple member.

It is an additional object of the present invention to provide a removable amplifying unit and a cushion mounting for the receiver of an eyeglass hearing aid which are of compact, simple construction, inexpensive to manufacture, and effective in their operation.

The novel features which I believe to be characteristic of my invention are set forth with particularity in the appended claims. The invention, itself, however, both as to its organization and method of operation, will best be understood by reference to the following description taken in connection with the accompanying drawings in which:

Figure 1 is a view in perspective of an eyeglass hearing aid;

Figure 2 is a view through section 2—2 of Figure 1 with a part of the cover of the temple member broken away;

Figure 3 is an exploded bottom view of the temple member, with parts of the temple member and cover shown in cross-section;

Figure 4 is an elevational view of a portion of the detachable cover showing the battery opening without the metal covering in place;

Figure 5 is a view through section 5—5 of Figure 2;

Figure 6a is a view through section 6—6 of Figure 1;

Figure 6b is a view similar to 6a except with the knob in position of normal use;

Figure 7a is a view looking forward through the temple member with the cover removed showing the amplifying unit in position within the temple member; and Figure 7b is a view similar to Figure 7a except that the amplifying unit is cocked for removal from the temple member.

The eyeglass hearing aid embodying the present invention is shown generally in Figure 1. The eyeglass hearing aid has a front 10 and a pair of temple members 12 and 14. The front 10 may, for example, include a pair of lens-receiving frames 10a, lens 10b within the frames, and a nose bridge 10c connecting the frames. The temple members 12 and 14 each have a hinge 10d connected at one end which connects to the outboard edge of front 10.

The temples 12 and 14, which may be made of plastic material, are shaped to bear against the head of the wearer over the ears as conventional eyeglass temples. The components of a complete hearing aid are contained within one temple. If the wearer's hearing is defective in only one ear, the other temple may be without hearing aid components. If hearing in both ears is defective each temple may house a hearing aid. If both temples contain hearing aid units the construction may be similar in each temple. For convenience only the details of temple 12 are herein described.

The temple 12 is of generally channel shaped construction as shown best in Figure 5, having an upper wall 16, a lower wall 18, and an outer wall, or web, 20. An inner wall 22 is removable and constitutes a detachable cover for the temple member. The cavity 24 defined by the walls of the temple member contain the components of a complete hearing aid.

As shown in Figure 2, the cavity 24 defined by the walls of the temple is divided into sections or compartments 24a, 24b, 24c, and 24d, each receiving parts of the hearing aid unit as hereinafter described. Immediately to the rear of compartment 24a, which is the rear section of the hearing aid, and forward of the section 24d, which is the forward section of the hearing aid, are solid sections which have embedded therein a metal socket 23 having internal threads, as shown in Figure 3. These sockets receive the screws 25 which pass through the cover 22 and secure the cover in position on the temple member. In the central section of the temple member are two additional sockets receiving screws 25 to hold the cover in place as hereinafter described. The rear section 24a of cavity 24 houses a microphone 26. One wall of the temple member adjacent section 24a has an opening, or openings 28, through which airborne sound waves can be carried to the microphone (see Figure 1).

Immediately forward of section 24a and separated therefrom by the arcuate wall 30, is section 24b which houses the hearing aid battery 32. Forward of the battery are solid portions 34a and 34b which extend from the top and bottom wall 16 and 18, respectively. The inner edges of the solid portions are cut to form shoulders 34c and 34d, respectively. The solid portion 34b has embedded therein a socket 23 to receive screw 25 passing through the cover to secure the cover to the temple member. As shown in Figure 4, the inner wall or cover, 22 has an opening 36 with a circular portion 36a and forward thereof rectangular portion 36b. The opening 36 is aligned with the section 24b when the cover 22 is in position. The circular portion 36a of the opening is slightly larger at the exterior face of wall or cover 22 to form the shoulder 37 at the margin of the opening. The exterior face of the cover 22 has a slight depression 40 forward of the circular portion 36a of the opening. Adjacent the rectangular portion 36b of the opening and on either side thereof are protrusions 42 extending from the inner face of the wall or cover 22.

The battery section 24b has a metal cover 44 having a shape conforming with the opening 36, with a circular portion 44a and a rectangular portion 44b (see Figure 3). Depending from each side of the rectangular portion are ears 44c which carry pin 44d. Depending from the rear of the rectangular section is heel portion 44e.

The ends of pin 44d seat on shoulders 34c and 34d respectively and nestle between protrusions 42 when the cover 22 is in place on the temple member. The circular portion of the metal cover seats on shoulder 37 in the circular portion of the opening 36. The finger nail of the wearer may be inserted in depression 40 to raise the cover for replacement of the battery 32. A clip 46 is secured at the bottom of the battery section 24b and contacts one element on the battery. Another clip 48 is secured between the solid portions 34a and 34b and contacts heel 44e of the metal cover to establish electrical contact with the other element of the battery through the metal cover 44. The forward end of clip 48 seats on a base having a socket 23 embedded therein. A screw 25 passes through the cover and clip and engages the socket to secure the cover in place.

Immediately forward of section 24b and divided therefrom by wall 49 is section 24c which receives the receiver 50. As shown in Figure 5, the receiver 50 has a casing 52 having a circular sound output opening 54. The sound output opening 54 has a protruding tube 56. The lower wall 18 of the temple member has an opening 58 aligned with the sound output opening 54, and the tube 56. The opening 58 receives a grommet 60 which has, outside the temple member, a neck portion 62. The neck portion 62 receives the plastic sound tube 64 and, as shown, has a bulge to securely hold the sound tube. The hollow sound tube 64 leads to the ear piece 66 which is suspended by the sound tube below the temple member for insertion in the ear.

The opening 58 is larger at the outer face of wall 18 to define a shoulder 68. The grommet 60 has a circular flange 70 which seats on shoulder 68. That portion of the grommet which extends through the wall 18 has a circular central bore 72 adjacent the outer face of wall 18 and a larger bore 74 adjacent the inner face of wall 18 to define a shoulder 76 inside the grommet. The wall of that part of the grommet extending through wall 18 is bent outwardly at the inner face of wall 18 to fixedly secure the grommet in position.

A short, flexible cushioning tube 78 is snugly received at one end on the tube 56 of the receiver. At the opposite end the tube 78 is snugly received in the bore 74 of the grommet 60 and seats against shoulder 76. Thus a continuous passage from inside the casing 52 of the receiver to the ear piece 66 is defined. The receiver 50 is held out of contact with the walls of the cavity section 24c by blocks of cushioning material 80 interposed between the walls and the receiver. Although the blocks 80 may be interposed between each wall and the receiver it is not necessary that the receiver be held by the blocks from contact with every wall since the tube 78 engages both the tube 56 on the receiver and the grommet 60 to assist in holding the receiver in position in section 24c. Thus, for example, with no cushioning material between the receiver 50 and the detachable cover 22 the receiver will be held in spaced relation to the cover by the cushioning tube 78 and the cushioning blocks 80 sandwiched between the receiver and some of the other walls of the temple member. The cover 22 has a depression 22a on its inner face adjacent the receiver 50 to provide additional clearance for that unit.

Immediately forward of section 24c and separated therefrom by wall 82 is section 24d. A slot 84 is cut in the lower wall 18, which is one of the walls defining section 24d, adjacent the rear portion of that section. The slot is cut in the longitudinal direction parallel to wall, or web, 20 and adjacent that wall.

The section 24d receives the amplifying unit shown generally at 86 in Figure 3. The amplifying unit consists of chassis 88 and the components of the amplifying circuit. The chassis may have a circuit (not shown) printed thereon. The components include a volume control unit 90 and may include transistors, capacitors, resistors and a transformer. The volume control unit has a rotatable shaft 90a internally threaded at its outer end. The knob or disc 98 is received on the end of shaft 90 and secured thereto by screw 90b.

The knob or disc 98 has a generally circular edge portion 98a and a second edge portion 98b which may be straight to define a flat. The second edge portion 98b has a smaller radial reach than the circular edge portion 98a of the knob or disc. The diametral distance across the knob or disc from the second edge portion 98b to the diametrically opposite edge is less than the span or distance between wall 16 and 18 of the section 24d. The radius of the knob or disc at its circular edge portion 94a is sufficiently large so that when the amplifying unit 86 is received in the section 24d the circular portion of the knob or disc will extend through the slot 84 and extend outside of the temple member. A notch 98c or other suitable marking is put on the disc or knob opposite the second edge portion 98b.

With this construction the knob or disc extends through the temple and may be readily rotated by the wearer for control from outside the temple member. At the same time, despite the fact that the knob or disc extends through the temple, the amplifying unit 86 is readily removable from section 24d of the temple when the cover 22 is removed. In use the disc will be in a position to give the volume required for the wearer. As shown in Figure 6b, although the circular edge portion 98a will extend through the slot 84, the second edge portion 98b of smaller reach will not usually be opposite the slot 84. In order to remove the amplifying unit 86 from the temple member the disc is rotated to the position of Figure 6a with the second edge portion 98b of smaller reach opposite the slot 84. Another view of the disc in this position is shown in Figure 7a. The disc is pushed through the slot 84 causing the amplifying unit to rotate, thus elevating the side opposite the slot. After the amplifying unit is cocked in this manner, as shown in Figure 7b it can then be readily disengaged from the temple member.

The feedback herein discussed is the mechanical feedback that develops by reason of the communication of vibration from the receiver 50 to the temple 12 and thence to the microphone 26. The sound tube construction including the tube 78, serves to isolate the receiver from the temple member and thereby prevents mechanical feedback.

While I have shown and described a specific embodiment of the present invention, it will, of course, be understood that various modifications and alternative constructions may be made without departing from the true spirit and scope of the invention. I therefore intend by the appended claims to cover all such modifications and alternative constructions as fall within their true spirit and scope.

What I claim as new and desire to secure by Letters Patent is:

1. An eyeglass hearing aid construction having an amplifying circuit with removable components comprising in combination: an elongated channel shaped temple member having a web portion and defining a cavity, the temple member adapted to receive a detachable cover to enclose said cavity and having a slot adjacent the web portion of the channel; a chassis received in said cavity, the chassis carrying components of the amplifying circuit, one of said components being an adjusting device having a rotatable control shaft; a knob secured to said shaft and having an edge portion of generally circular conformation which in assembled position is received in and extends through said slot for rotation from outside the temple member and having another edge portion of smaller radial reach than said first edge portion, the diametral distance across the knob from said second edge portion being sufficiently less than the span of the cavity to permit the knob to be disengaged from the slot for removal of the chassis from the temple member when the knob is rotated to a position with the second edge portion opposite the slot.

2. An eyeglass hearing air construction having an amplifying circuit with removable components comprising in combination: an elongated channel shaped temple member having a web portion and defining a cavity, the temple member adapted to receive a detachable cover to enclose said cavity and having a longitudinal slot parallel to and adjacent the web portion of the channel; a chassis received in said cavity, the chassis carrying components of the amplifying circuit including a volume control unit having a rotatable control shaft; a disc secured to said shaft and aligned with the slot, the disc being of generally circular conformation with a diameter of sufficient size so that the circular edge of the disc protrudes through the slot for rotation from outside the temple member, the disc having a flat on one side with the distance from the flat to the opposite circular edge being less than the span of the cavity whereby the flat on the disc may be positioned opposite the slot to permit cocking the chassis for disengagement of the disc from the slot and removal of the chassis from the temple member when the detachable cover is removed.

3. A compact construction for housing a removable chassis having an adjusting device comprising in combination: a channel shaped housing having a web portion and a pair of spaced walls upstanding from said web portion and forming dihedral lines where they join the web portion, one of said walls having a slot parallel to the dihedral line formed where said wall joins the web; a chassis received within the walls of the housing; an adjusting device secured on the chassis and having a rotatable shaft; and a disc secured to said shaft having edge portions of different distance from the shaft, one of said edge portions extending through the slot for rotation from outside the housing, the other edge portion defining a span across the disc from that edge less than the span between the walls of the housing whereby the disc can be rotated to a position where its span normal to the walls is less than the span between the walls for disengagement from the slot and the housing.

4. A compact construction for housing a removable adjusting device comprising in combination: a channel shaped housing having a web portion and a pair of spaced walls upstanding from said web portion, one of said walls having a slot; an adjusting device having a rotatable control shaft received between the walls of the housing; and a disc secured to said shaft having edge portions of different distance from the shaft, one of said edge portions extending through the slot for rotation from outside the housing and the other of said edge portions extending a distance from the shaft to define a span across the disc from that edge less than the span between the walls of the housing whereby the disc can be rotated to a position where its span normal to the wall is less than the span between the walls for disengagement from the housing.

References Cited in the file of this patent

UNITED STATES PATENTS 2,765,373    Smith _____ Oct. 2, 1956

FOREIGN PATENTS 723,981    Great Britain _____ Feb. 16, 1955

UNITED STATES PATENT OFFICE
CERTIFICATE OF CORRECTION

Patent No. 2,878,322                                          March 17, 1959

Sam Posen

It is hereby certified that error appears in the printed specification of the above numbered patent requiring correction and that the said Letters Patent should read as corrected below.

Column 6, line 7, for "air" read — aid —.

Signed and sealed this 18th day of August 1959.

(SEAL)

Attest:

KARL H. AXLINE                                               ROBERT C. WATSON

Attesting Officer                                            Commissioner of Patents